US012556844B1

(12) United States Patent
McWilliams

(10) Patent No.: US 12,556,844 B1
(45) Date of Patent: Feb. 17, 2026

(54) SYSTEM FOR REAL-TIME DISPLAY OF OPERATIONAL PARAMETERS OF A USER DEVICE

(71) Applicant: Stuart McWilliams, Bellevue, NE (US)

(72) Inventor: Stuart McWilliams, Bellevue, NE (US)

( * ) Notice: Subject to any disclaimer, the term of this patent is extended or adjusted under 35 U.S.C. 154(b) by 0 days.

(21) Appl. No.: 19/068,040

(22) Filed: Mar. 3, 2025

(51) Int. Cl.
  *H04Q 9/00* (2006.01)
  *B60K 35/21* (2024.01)
  *G06F 3/14* (2006.01)

(52) U.S. Cl.
  CPC ............ *H04Q 9/00* (2013.01); *B60K 35/21* (2024.01); *G06F 3/14* (2013.01); *B60K 2360/167* (2024.01); *H04Q 2209/30* (2013.01)

(58) Field of Classification Search
  None
  See application file for complete search history.

(56) References Cited

U.S. PATENT DOCUMENTS

| 7,786,851 | B2 * | 8/2010 | Drew | B60K 35/85 |
| | | | | 345/1.3 |
| 11,669,190 | B2 * | 6/2023 | Lee | G06F 3/04812 |
| | | | | 345/173 |
| 2004/0196209 | A1 * | 10/2004 | Chen | G06F 1/1601 |
| | | | | 345/1.1 |
| 2010/0304792 | A1 * | 12/2010 | Li | H04B 1/3877 |
| | | | | 455/566 |
| 2012/0040719 | A1 * | 2/2012 | Lee | G06F 3/1454 |
| | | | | 455/557 |
| 2015/0106728 | A1 * | 4/2015 | Botzer | H04L 67/125 |
| | | | | 715/740 |
| 2025/0276608 | A1 * | 9/2025 | Godfrey | H04W 4/80 |

* cited by examiner

*Primary Examiner* — Steven Lim
*Assistant Examiner* — Jerold B Murphy

(57) ABSTRACT

The present disclosure provides a system which incorporates a plurality of gauge displays, similar to those common in the automotive industry, in a housing alongside a controller. The controller interfaces with a user device such as a PC through a data connection port and determines operational parameters of the user device, converting them into values for corresponding gauge displays in real-time. A user can thus monitor the status of their machine or software applications without sacrificing screen real-estate during activities such as gaming or other productivity tasks. The system may also incorporate a front-end application software which, when installed on the user device, can control the types of output readings which are assigned to different gauges.

13 Claims, 2 Drawing Sheets

SYSTEM FOR REAL-TIME DISPLAY OF OPERATIONAL PARAMETERS OF A USER DEVICE

FIELD OF INVENTION

The present invention relates generally to the technical field of computer accessories. More specifically, the present invention relates to a system capable of displaying operational parameters from a user device on a separate hardware apparatus in real-time.

BACKGROUND

In the modern era, computers are widely used for a variety of applications, from productivity and content creation to entertainment and system monitoring. Many users require real-time feedback on system performance, whether for optimizing resource-intensive tasks, tracking application-specific metrics, or monitoring external data sources. Some of these operational parameters—such as processor usage, memory consumption, and system temperatures—are constantly tracked by various sensors and in-built algorithms. Viewing these parameters typically requires third-party applications or built-in overlays that display information on the primary screen.

A challenge with this approach is that screen real estate is often a critical resource, especially in applications where an unobstructed view is essential, such as gaming, professional workflows, or media consumption. Displaying performance metrics as an on-screen overlay can interfere with the user experience, reduce available workspace, or obstruct key visual elements. A more effective solution would be a system that extracts operational data from a computer and its applications and displays it on a separate, dedicated interface in an intuitive and visually appealing manner.

It is within this context that the present invention is provided.

SUMMARY

The present disclosure provides a system which incorporates a plurality of gauge displays, similar to those common in the automotive industry, in a housing alongside a controller. The controller interfaces with a user device such as a PC through a data connection port and determines operational parameters from the user device, converting them into values for the corresponding gauge displays in real-time. A user can thus monitor the status of their machine and applications without sacrificing screen real-estate during various activities, including gaming, productivity tasks, and other software interactions. The system may also incorporate a front-end application software which, when installed on the user device, can control the types of output readings which are assigned to different gauges.

Thus, according to one aspect of the present disclosure there is provided a system for displaying the operational parameters from a user device in real-time, the system comprising: a housing having a flat bottom surface; one or more gauge displays installed in the housing such that the displays are visible from the housing exterior; a data connection port extending from the housing and configured to interface with a user device; a power source or external power supply.

The system further comprises a controller disposed within the housing and coupled to the one or more gauge displays, the data connection port, and the power source, the controller being configured to: receive, from a user device connected to the data connection port, a continuous stream of operational parameter or output readings indicative of one or more operational parameters from the user device; assign, for each of the one or more operational parameter or output readings, a corresponding gauge display; and operate each of the corresponding gauge displays to reflect, in real-time, the reading for the corresponding operational parameter or output.

In some embodiments, the operational parameters include one or more of: CPU percentage usage, RAM percentage usage, hard drive percentage usage, temperature, and fan speed, as well as application-specific metrics such as in-game statistics, notification counts, or other real-time software-generated data.

In some embodiments, the one or more gauge displays are detachable and interchangeable with other types of gauge displays.

In some embodiments, the system further comprises one or more control interfaces disposed on an exterior surface of the housing and coupled to the controller.

In such embodiments, the system may further comprise one or more RGB LEDs connected to the controller, and the controller is configured to adjust the brightness or hue of the RGB LEDs in response to actuation of the one or more control interfaces.

In some embodiments, the controller is further configured to receive an indication of a scale or range of an installed gauge display and, in response to receiving the corresponding operational parameter or output, convert operational parameter or output readings into values that match the scale of the corresponding gauge display.

In some embodiments, the system further comprises a front end software application installed on a user device, the front end software application comprising an application programming interface, API, configured to determine operational parameters and outputs from the user device.

In some embodiments, the front end software application interfaces with other third-party applications in order to read and display operational parameters and outputs from the third-party application.

In such embodiments, the front-end software application may comprise a user interface through which a user may assign specific operational parameters and outputs to specific gauge displays installed in the housing.

In some embodiments, the controller is configured to convert the operational parameters and outputs of the user device to voltage values for controlling the corresponding gauge displays via pulse width modulation, PWM.

In some embodiments, the controller is configured to convert the operational parameters and outputs of the user device to resistance values for controlling the corresponding gauge displays via a digital potentiometer or variable resistor network.

In some embodiments, the one or more gauge displays include one or more screens displaying digital numbers.

In some embodiments, the one or more gauge displays include one or more automotive vehicle gauge displays comprising physical dials.

In some embodiments, the data connection port is a USB-C connection.

In some embodiments, the data connection port is a Micro-USB connection.

BRIEF DESCRIPTION OF THE DRAWINGS

Various embodiments of the invention are disclosed in the following detailed description and accompanying drawings.

Figure 1:
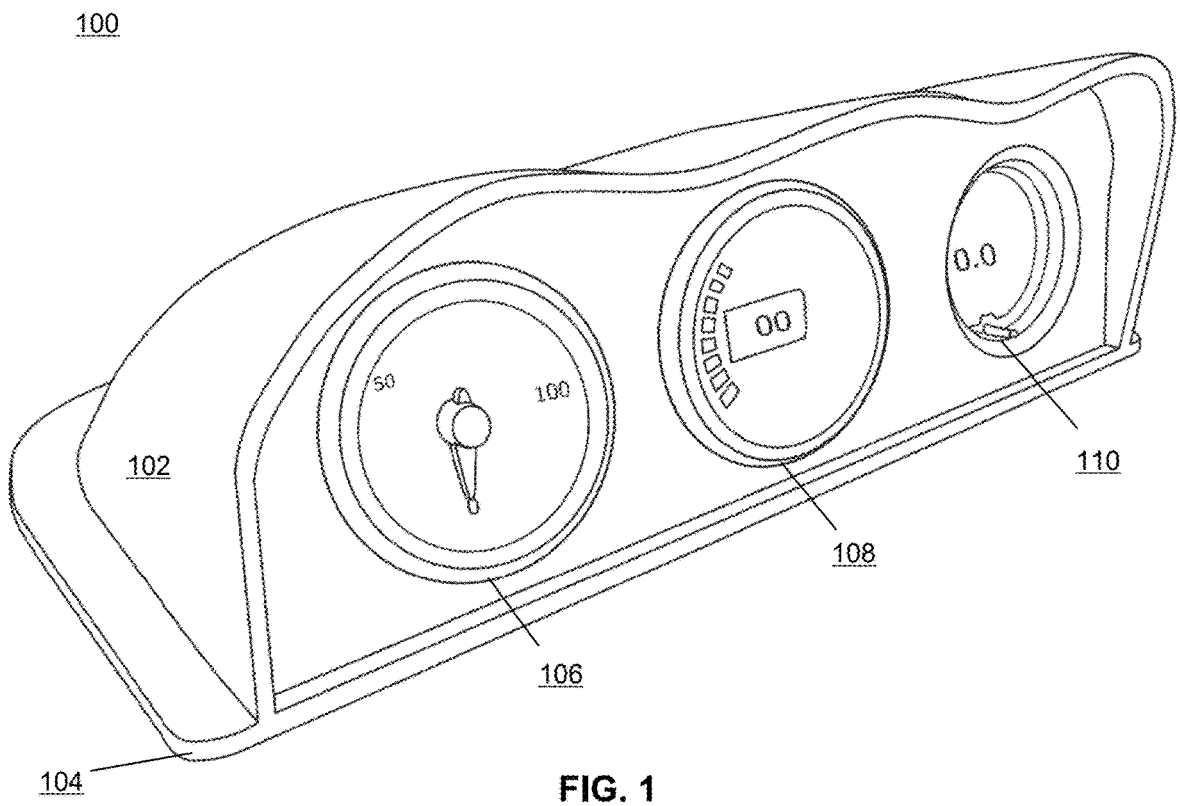
FIG. 1 illustrates an isometric view of an example configuration of a set of gauge displays installed in a housing of an apparatus according to the present disclosure which is not yet connected to a user device.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 2:
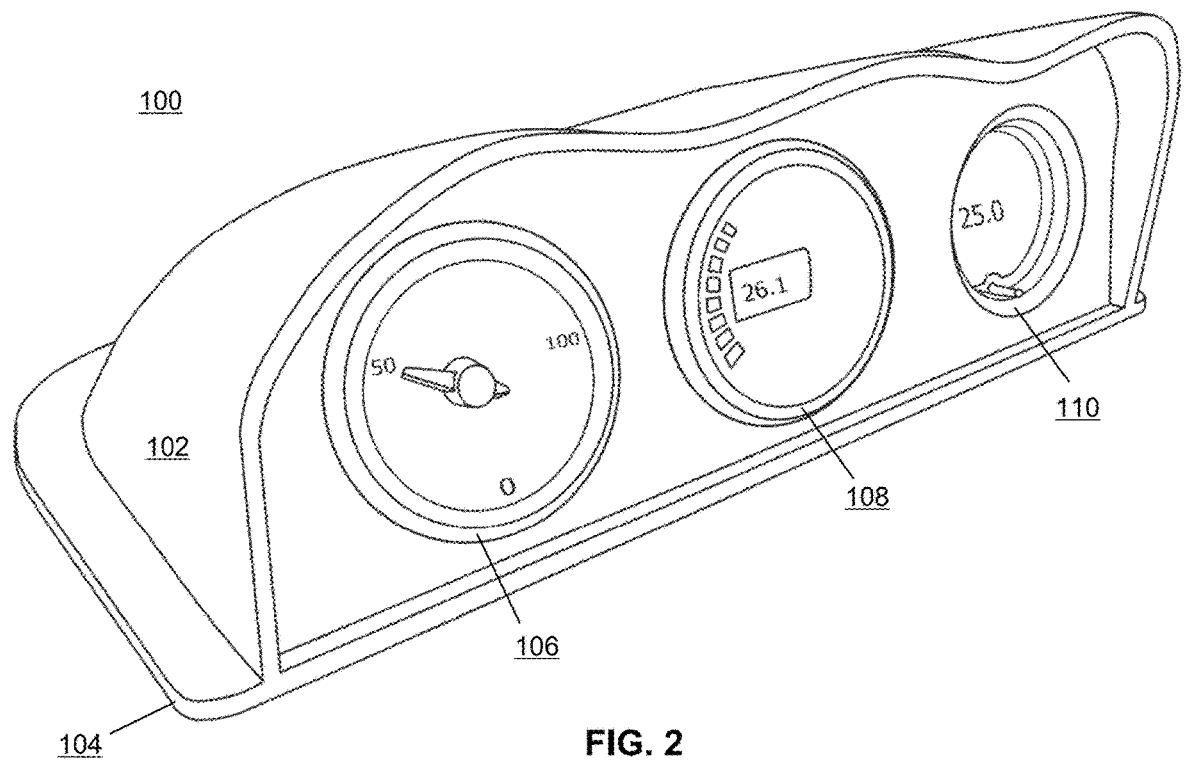
FIG. 2 illustrates an isometric view of the example configuration of the set of gauge displays with the apparatus connected to a user device, and the gauge displays reflecting the output values of operational parameters from the user device in real-time.

Referring to FIG. 1 and FIG. 2 isometric views are shown of an example configuration of an apparatus 100 comprising a set of gauge displays for displaying one or more operational parameters from a connected user device in real-time. The user device can technically be any user device with a processor and a suitable data port, for example a laptop or phone, but in practice would usually be a personal computer.

The apparatus 100 comprises a housing 102 which will usually be made of plastic or a similarly robust material, and which in the present example is shaped similarly to the dashboard of an automotive vehicle.

One of the advantages of the system of the present disclosure is the design space it creates for aesthetically appealing hardware, borrowing the aesthetics of the automotive industry and possibly even repurposing actual automotive gauges for use in displaying the operational parameters from a PC.

The housing 102 generally has a flat bottom 104 to allow it to rest easily on a desk next to a user device. The housing is shaped to accommodate one or more gauge displays in its exterior. In the present example three different gauge displays 106, 108, and 110, are installed in the housing, however fewer or more displays may also be used.

As can be seen, each of the gauge displays is of a different type. The first gauge display 106 consists of a physical dial, possibly repurposed from an automobile, which can move between 0 and 100 to represent a percentage. This gauge display would have a corresponding actuator coupled to the dial for controlling it. The second gauge display 108 has both a digital display showing numbers and a set of bars which could be lit up by LED backlighting to represent both an exact number and what proportion of the maximum parameter is being used, in the present example it is labelled to represent a temperature value. The third gauge display 110 is purely a digital display showing a number.

In FIG. 1 the apparatus 100 is in a resting state, either not connected to any user device, or connected to one which is not in operation, the values are thus all 0. In FIG. 2 the gauge displays are shown representing actual output values from a connected user device which is in operation. The values shown may for example indicate that a CPU load of the user device is currently at about 50%, the temperature from a sensor is reading 26.1 degrees Celsius, and 25% of the user device RAM is being used.

These are merely examples of the types of parameters that can be represented, and the types of gauges used to represent them. In some examples the gauges may be interchangeable with other gauge types, being easily detached form the housing 102 and replaced with another suitable type of gauge.

Figure 3:
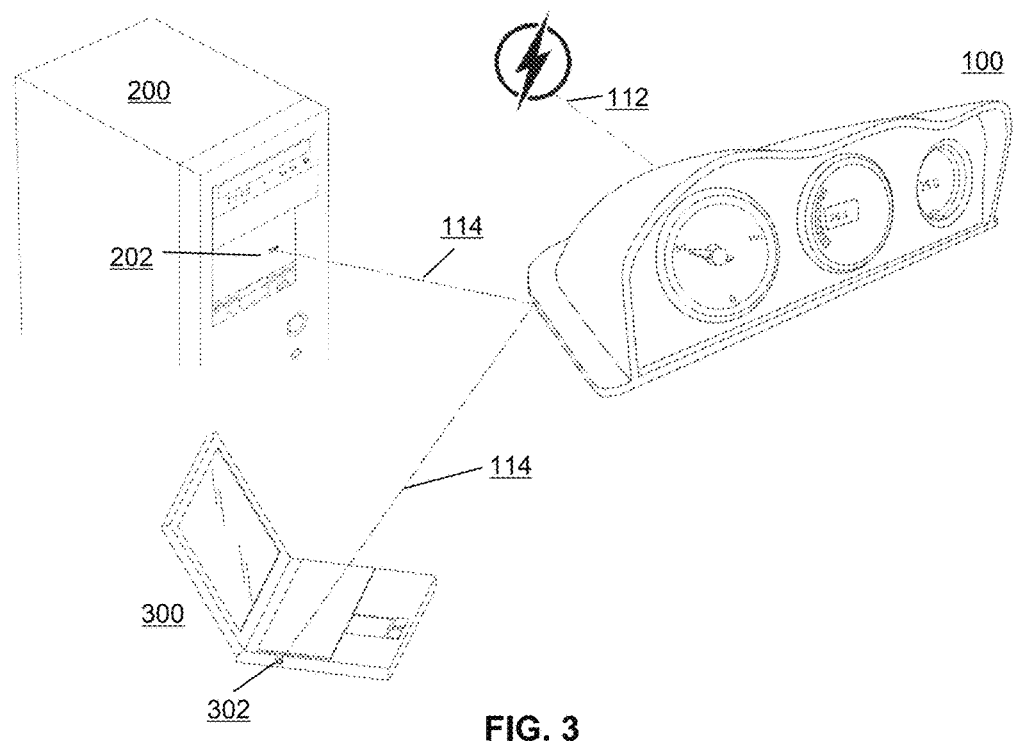
FIG. 3 illustrates a schematic of the example apparatus being connected to an external power outlet and to one of two different types of user devices.

Referring to FIG. 3, a schematic is shown of the example apparatus 100 being connected to an external power outlet 112 and also connected to both a PC 200 with a USB-C connection 202 and a laptop 300 with a USB-C connection 302 by data connection ports 114. This is merely to illustrate that different types of user devices can be interfaced with.

While an external power source 112 is illustrated, the apparatus 102 may also comprise an integrated internal power source, or a combination of the two.

Figure 4:
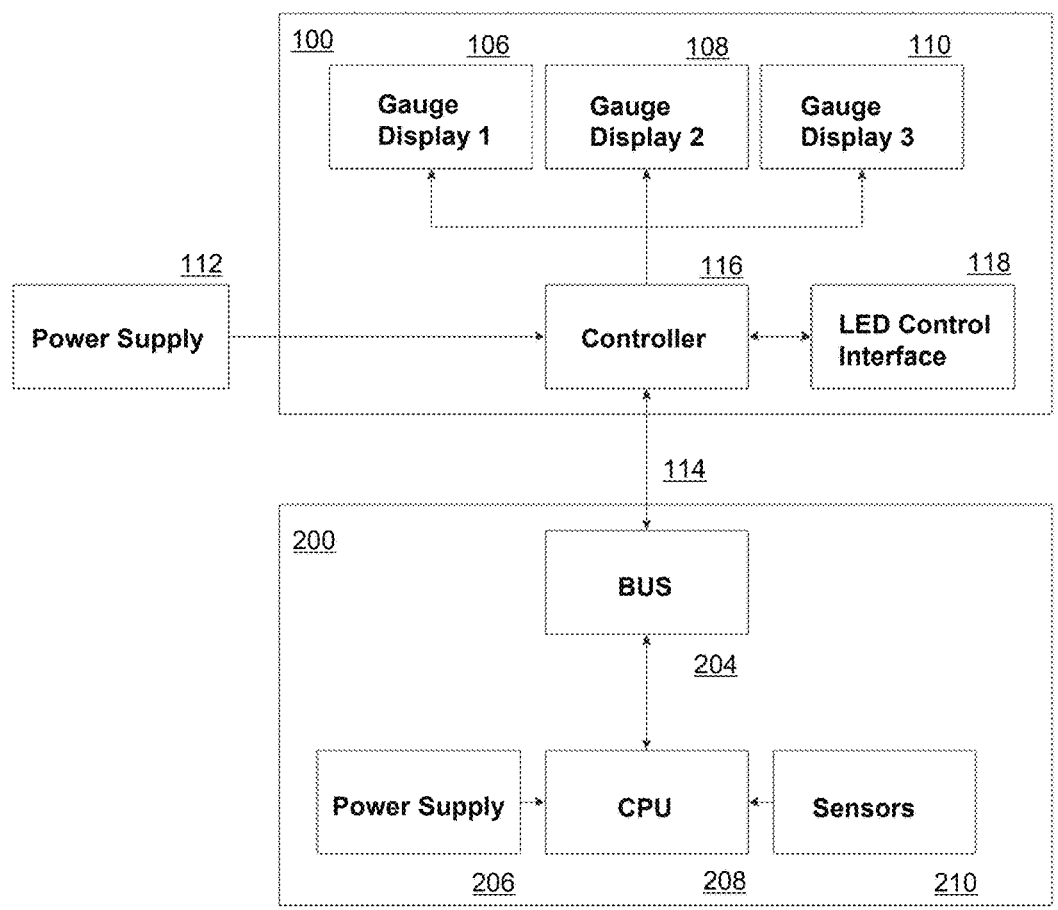
FIG. 4 illustrates a block diagram of the functional components of the system as connected to a user device to monitor its operational parameters.

Referring to FIG. 4 a block diagram is shown of the functional components of the system 100 as connected to a computer 200 to monitor its operational parameters.

In order to achieve this, the controller 116 of the apparatus 100 interfaces with a system management BUS 204 of the computer via data port connection 114, which is usually a USB-C connection. Through this connection the controller 116 may receive a continuous stream of data including sensor readings (fan speed, temperature, etc) from the one or more sensors 210, integrated applications, and/or other output readings of the current state of the operational parameters in real-time.

From this stream of data, the controller 116 determines the operational parameters from the PC 200 to be displayed. The controller 116 will then assign, based on pre-determined settings or configurations input by a user, a gauge display for each of the readings or outputs being monitored. The controller 116 may have stored in its memory an associated range that each gauge display is capable of showing. This allows the controller 116 to converting the received data into appropriate values for display on the corresponding gauge displays 106, 108, and 110 in real-time.

Based on this determination, the controller 116 operates each of the corresponding gauge displays 106, 108, and 110 to reflect the readings. As mentioned above, the gauge displays can include both digital displays and physical dials and other mechanisms. In order to convert the read data into appropriate gauge positions, controller 116 may be configured to convert the readings and outputs into voltage values for controlling the corresponding gauge displays via pulse width modulation, or PWM. This may be done on a standard scale of 0-5V, for example. The controller 116 may also be configured to convert the readings and outputs into resistance values for controlling the corresponding gauge displays via a digital potentiometer or variable resistor network. This may be done on a standard scale of 0-100 ohms, for example.

The system may also incorporate a front-end application software and application programming interface which, when installed on the PC 200, can control the types of output readings which are assigned to different gauges, as well as other settings. For example, the apparatus may comprise one or more RGB LEDs connected to the gauge displays, and the user may be able to control these via a user interface of the application software.

Alternatively, as shown in FIG. 4, the apparatus 100 itself may comprise an LED control interface 118 for controlling the hue and intensity of the LEDs. The control interface may include buttons, dials, switches, touch screens, etc.

As will be apparent to those of skill in the art, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

In accordance with the teaching of the invention a computer and a computing device are articles of manufacture. Other examples of an article of manufacture include: an electronic component residing on a mother board, a server, a mainframe computer, or other special purpose computer each including one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device.

The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the system have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A system for displaying the operational parameters from a user device in real-time, the system comprising:
   a housing having a flat bottom surface;
   one or more gauge displays installed in the housing such that the displays are visible from the housing exterior;
   a data connection port extending from the housing and configured to interface with a user device;
   a power source or power input; and
   a controller disposed within the housing and coupled to the one or more gauge displays, the data connection port, and the power source, the controller being configured to:
      receive, from a user device connected to the data connection port, a continuous stream of operational parameter or output readings indicative of one or more operational parameters from the user device, wherein operational parameters include one or more of: CPU percentage usage, RAM percentage usage, hard drive percentage usage;
      assign, for each of the one or more operational parameter or output readings, a corresponding gauge display; and
      operate each of the corresponding gauge displays to reflect, in real-time, the reading for the corresponding operational parameter or output, wherein the one or more gauge displays are one or more automotive vehicle gauge displays comprising physical dial mechanisms.

2. A system according to claim 1, wherein operational parameters further include one or more of temperature, fan speed, and application-specific metrics such as in-game statistics, notification counts, or other real-time software-generated data.

3. A system according to claim 1, wherein the one or more gauge displays are detachable and interchangeable with other types of gauge displays.

4. A system according to claim 1, wherein the system further comprises one or more control interfaces disposed on an exterior surface of the housing and coupled to the controller.

5. A system according to claim 4, wherein the system further comprises one or more RGB LEDs coupled to the controller, and the controller is configured to adjust the brightness or hue of the RGB LEDs in response to actuation of the one or more control interfaces.

6. A system according to claim 1, wherein the controller is further configured to receive an indication of a scale or range of an installed gauge display and, in response to receiving the parameters of a corresponding operational parameter or output, convert readings of the corresponding operational parameter or output to an appropriate value for the gauge display scale.

7. A system according to claim 1, wherein the system further comprises a front-end software application installed on a user device, the front end software application comprising an application programming interface, API, configured to determine operational parameter readings and other outputs from the user device.

8. A system according to claim 7, wherein the front-end software application comprises a user interface through which a user may assign specific operational parameter readings and outputs to specific gauge displays installed in the housing.

9. A system according to claim 1, wherein the controller is configured to convert the operational parameters and outputs of the user device to voltage values for controlling the corresponding gauge displays via pulse width modulation, PWM.

10. A system according to claim 1, wherein the controller is configured to convert the operational parameters and outputs of the user device to resistance values for controlling the corresponding gauge displays via a digital potentiometer or variable resistor network.

11. A system according to claim 1, wherein the one or more gauge displays include one or more screens displaying digital numbers.

12. A system according to claim 1, wherein the data connection is a Micro-USB connection.

13. A system according to claim 1, wherein the data connection is a USB-C connection.

* * * * *